United States Patent [19]

Saltini et al.

[11] 3,849,634

[45] Nov. 19, 1974

[54] ELECTRONIC COMPUTER

[75] Inventors: Fabrizio Saltini, Modena; Vittorio Eccettuato, Cornaredo (Milano), both of Italy

[73] Assignee: Ing. C. Olivetti & C., S.p.A., Ivrea (Torino), Italy

[22] Filed: Sept. 11, 1972

[21] Appl. No.: 287,830

[30] Foreign Application Priority Data

June 21, 1969 Italy .................................. 52336/69

[52] U.S. Cl......... 235/92 DP, 235/92 SH, 235/92 R, 328/37, 340/173 RC

[51] Int. Cl. .......................................... H03k 27/00

[58] Field of Search.................... 235/92 SH, 92 DP; 340/173 RC; 328/37

[56] References Cited

UNITED STATES PATENTS 3,230,514 1/1966 Kliman............................ 235/92 SH

*Primary Examiner*—Gareth D. Shaw

*Assistant Examiner*—Joseph M. Thesz, Jr.

*Attorney, Agent, or Firm*—Schuyler, Birch, Swindler, McKie & Beckett

[57] ABSTRACT

An electronic computer having an arrangement for shifting the characters stored in selected registers of the memory is disclosed, wherein the shift of the characters is controlled by an instruction causing a control unit to select the register to be shifted and to activate the arrangement. The arrangement comprises a one-character register which is first connected by the control unit with the last significant stage of the selected register for exchanging the characters stored therein. The one-character register is then connected with the most significant stage of the selected register, whereby the character previously stored in the last significant stage is now stored in the most significant stage. The one character register is then connected with the successive stages of the selected register whereby the characters are shifted step-by-step by one stage. A counter is provided for counting the number of changes performed and for causing the control unit to stop the exchanging operation upon completion.

3 Claims, 6 Drawing Figures

ELECTRONIC COMPUTER

This application is a division of U.S. application Ser. No. 47,338 filed June 18, 1970 now U.S. Pat. 3,691,531.

CROSS REFERENCE TO RELATED APPLICATION

Applicants claim priority from corresponding Italian Pat. application Ser. No. 52336-A/69, filed June 21, 1969.

BACKGROUND OF THE INVENTION

1. Field of the Invention

This invention relates to an electronic computer having an arrangement for shifting the characters stored in selected registers of the memory.

2. Description of the Prior Art

Some operations in electronic computers require the shifting of the characters stored in a random access memory (RAM). For instance, when a character (multiplicand) stored in an input/output register of the RAM is to be multiplied with a second character (multiplier) stored in a second register of the RAM, the computer adds the multiplicand to itself a number of time specified by the last significant digit of the multiplier. The result is then stored in a third register of the RAM. Next the partial product stored in the third register is shifted and rounded to one digit toward the last significant digit. The same operations are performed for the second digit of the multiplier and the second partial product is firstly added to the first and then shifted in the third register and so on.

To carry out the shifting, some computers use particular registers, external to the RAM, to which the characters to be shifted are transferred for the shifting and from which they are removed after the shifting.

Also known are barrel switches, which have been widely used in computers for shifting the contents of a register by a selected number of places to the right or the left. Both of these systems are able to shift the contents of the selected register quite rapidly but both require a substantial amount of hardware and thus are often too expensive for use in low cost computer systems. These lower cost systems need a method of shifting their contents which does not entail a large amount of hardware, even if at some sacrifice in speed.

SUMMARY OF THE INVENTION

In accordance with the present invention, there is provided an electronic computer having an arrangement for shifting the characters stored in selected registers of the memory is disclosed, wherein the shift of the characters is controlled by an instruction causing a control unit to select the register to be shifted and to activate the arrangement. The arrangement comprises a one-character register which is first connected by the control unit with the last significant stage of the selected register for exchanging the characters stored therein. The one-character register is then onnected with the most significant stage of the selected register, whereby the character previously stored in the last significant stage is now stored in the most significant stage. The one-character register is then connected with the successive stages of the selected register whereby the characters are shifted step-by-step by one stage. A counter is provided for counting the number of changes performed and for causing the control unit to stop the exchanging operation upon completion.

Various other objects advantages and features of the invention will become more apparent in the following specification with its appended claims and accompanying drawings, in which:

DETAILED DESCRIPTION OF THE INVENTION

The invention can best be understood from the following detailed description of the illustrated embodiment.

GENERAL DESCRIPTION

Figure 1:
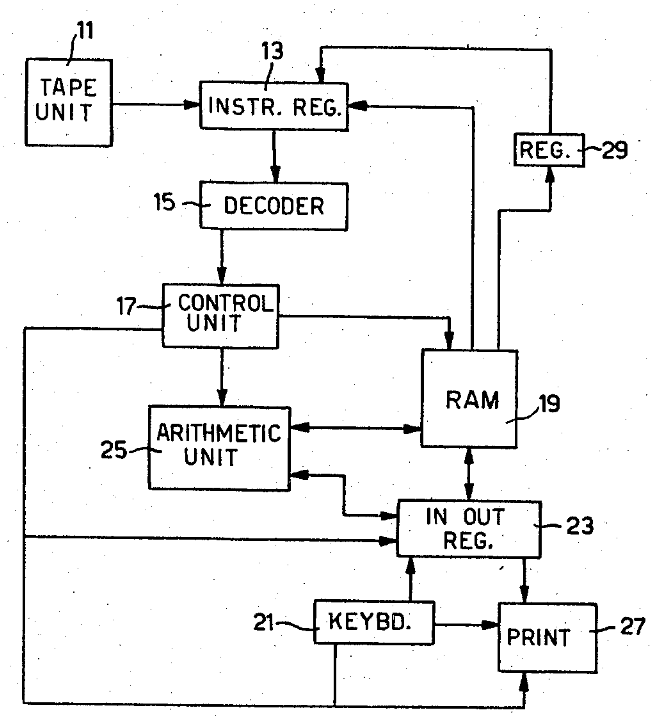
FIG. 1 is a block diagram of an embodiment of a computer according to the invention.

Referring to FIG. 1 of the drawings, the instructions of the program to be executed are read one at a time from the serial portion of the operational memory, which may be formed of a loop of magnetic tape, by the tape unit 11 and transferred to the instruction register 13. The addresses of successive instructions of the program are preferably physically spaced on the tape loop in a manner such that, for most arithmetic and logical instructions, the execution time of the instruction is somewhat less than the time necessary for the following instruction to become available on the tape. This enables the tape to continue to run continuously rather than having to stop and start with each instruction. Other instruction addresses may be interspersed between successive instructions of the program.

The instruction read from the tape loop is stored in the instruction register 13 while it is being executed. The instruction in the register 13 is decoded in decoder 15 whose output is connected to the control unit 17. The control unit 17 then controls the operation of the computer to execute the instruction.

The data to be operated on in carrying out the program is stored in the random access memory 19. Data may be entered into the memory 19 from the keyboard 21 through the input-output register 23. From the I/O register 23 the data may be transferred either to the memory 19 or directly to the arithmetic unit 25 for processing. Data stored in the memory 19 may be transferred to the printer 27 through the I/O register 23 for being printed out.

In the illustrated embodiment of the invention the keyboard 21 may include a numerical keyboard for entering numbers into the I/O register 23, an alphanumeric keyboard for typing information directly by means of the printer 27 and a command keyboard for entering commands into the control unit 17. The use of these keyboards and the length of the numerical data which may be entered are controlled by control unit 17 in response to program instructions.

The register 29 may be used for the indirect addressing of locations in the memory 19 and in the program storing tape unit 11.

Figure 2:
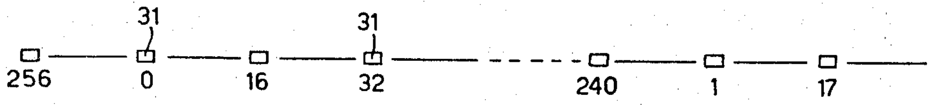
FIG. 2 shows the preferred way of interspersing the addresses of program instructions.

Referring to FIG. 2 of the drawings there is shown a portion of one of the tracks on the tape loop. In the illustrated embodiment of the invention each track can contain up to 256 instructions and there are five tracks on the tape. Each instruction is associated with a track address 31 recorded immediately before it and, in the illustrated embodiment, the addresses 31 are interspersed so that each instruction has 15 instructions recorded between it and the next instruction to be executed. Other schemes of arranging the instructions on the tape are also possible depending on the speed of movement of the tape and on the processing speed of the computer.

In the instruction format used in the illustrated embodiment of the invention, each instruction consists of four 4 bit characters. The first character is a general operation code which indicates how the other three characters are to be interpreted. This character may indicate, for example, Arithmetic, Tabulation, Keyboard Input, Print Out, Paper Handling, Jump or Multiplication operations.

The significance of the following three characters of the instruction depends on the value of the first character. They may be, for instance, addresses for the memory 19, specific operation codes, constants, addresses for the tape unit 11 or codes for controlling the keyboard 21 or the printer 27.

Figure 3:
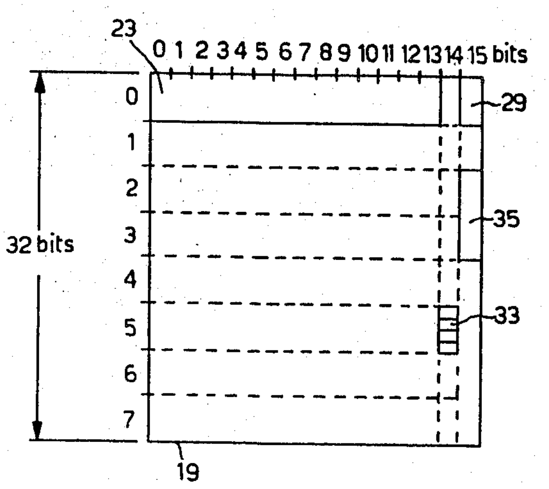
FIG. 3 shows the organization of the random access portion of the operational memory.

The memory 19 may, in the preferred embodiment of the invention, be made up of a commercially available 32 × 32 bit magnetic core memory, a 32 × 16 bit portion of which is illustrated in FIG. 3 of the drawings. The 32 bit side of the illustrated portion of the memory 19 may be divided into eight groups of four rows of bits, numbered 0 through 7 in FIG. 3, for making up 8 registers. Each register has a capacity of 14 four-bit digits, one digit being stored in each of the columns numbered 0 through 13 in FIG. 3. Column number 14 contains eight groups 33 of 4 bits, each of which is associated with the register whose rows it falls in. The least significant bit of each group 33 may be used for indicating the sign of the number stored in the associated register and another one of these bits may be used to indicate when the contents of a register are not equal to zero. In the preferred embodiment of the invention the input-output register 23 is physically a part of the memory 19 and occupies register number 0 of the portion of the memory 19 illustrated in FIG. 3.

Column number 15 of the memory 19 may be used as a service area. In the preferred embodiment of the invention the 4 bit indirect address register 29 is physically a part of this service area and occupies the same memory rows as the I/O register 23. Also stored in the service area is other information which is desired to be protected from loss in case of power failure. The address, on the program tape, of the program instruction presently being executed is stored in the 8 bit portion 35 of the service area. The indication of an overflow in an arithmetic operation and selected jump conditions may, for example, also be stored in the service area.

The other half of the memory 15 may also be divided into eight 14 digit registers so that the entire memory may include 16 data registers and the input output register 23.

As stated above, the type of operation which an instruction orders is determined by the first four bit character of the instruction.

If the first character of the instruction is an arithmetic operation code, the second character is a detailed operation code which defines the particular operation to be performed. The third and fourth characters of the arithmetic instruction are the address of two registers in the memory 19 on which the operation is to be performed. The addresses of the memory registers are 4 bits long and may be stored in either or both of the third or fourth character of an arithmetic instruction. The operation ordered by the detailed operation code may be different depending on whether the memory register address is located in the third or fourth character of the instruction.

The arithmetic instructions are preformed in two operation cycles. The indicated operation is first performed on the memory register addressed by the third character of the instruction and then on the register addressed by the fourth character. If the registers addressed by the third and fourth characters of an arithmetic instruction are called R3 and R4, respectively, and the input-output register 23 is called I/O, the following operations are typical of the operations which may be performed:

| | | | | | |
|---|---|---|---|---|---|
| (1) | R 3 − I/O | R 3 | | R 4 − I/O | R 4 |
| (2) | R 3 + I/O | R 3 | | R 4 + I/O | R 4 |
| (3) | R 3 | I/O | | R 4 − I/O | R 4 |
| (4) | R 3 | I/O | | R 4 + I/O | R 4 |
| (5) | R 3 | I/O ; 0 | R 3 | R 4 + I/O | R 4 |
| (6) | R 3 | I/O ; O | R 3 | R 4 − I/O | R 4 |
| (7) | R 3 | 0 | | R 4 O | |
| (8) | I/O | O | | | |
| (9) | I/O | O, except for the least significant digit of the I/O. | | | |

Normally, when the contents of a memory register are read for performing an operation they are automatically rerecorded so as to give the effect of a non-distructive read-out. In the instructions indicated at 5 and 6, however, the contents of R3 are not rerecorded so that R 3 is erased when its contents are transferred to the I/O. In the instructions indicated at 7, 8 and 9 the contents of the addressed registers or the I/O register 23 are erased. In the execution of the instructions indicated at 3 through 6, the contents of R 3 are first transferred to the I/O register 23 and then the operation with R 4 and the I/O is performed.

If the third character of an arithmetic instruction is zero the contents of the indirect address register 29 are transferred to the third character place of the instruction register 13 by the control unit 17 and used as the memory register address for the instruction. If the fourth character of an arithmetic instruction is zero no operation is performed on the fourth character.

It is also possible with a particular arithmetic instruction to transfer the contents of the third and fourth character of the instruction to the I/O register 23. This is useful when it is desired to use these characters as a constant for the program.

If the first character of an instruction is a tabulation operation code, the instruction commands the horizontal tabulation of the printer 27. In this type instruction the second and thqrd characters contain the location of the end of the tabulation movement and the fourth character indicates whether the operation is to be executed immediately or if the location of the end of the tabulation movement is merely to be stored mechanically in the printer 27.

A third value of the initial character of an instruction is used for indicating an instruction for controlling the numerical keyboard, for setting bits in the service area of the memory 19 for indicating jump conditions or for operating on the I/O register 23 and/or the indirect address register 29. The second character of this type of instruction may be used to set the maximum number of characters which may be entered into the I/O register 23 from the numerical keyboard in those instructions which unlock the numerical keyboard. The third character of the instruction may be used for setting or resetting selected bits in the service area of the memory 19 for indicating or extinguishing jump conditions. It also may order the transfer of the contents of the least significant character of the I/O register 23 to the indirect address register 29. The fourth character of the instruction may order the unlocking of the numerical keyboard with the number of digits which may be entered being controlled by the second character of the instruction. The fourth character may also be used to invert the sign of the I/O register 23 or for transferring the contents of the indirect address register 29 to the least significant character of the I/O register 23.

The initial character of an instruction may also take a fourth value which indicates that the instruction orders the printing of the contents of the I/O register 23 either in black or in red. An instruction of this type may also be used for controlling the punching of the contents of the I/O register 23 on paper tape by a paper tape punch unit (not shown).

The second character of a printing instruction may be used to determine the number of characters from the I/O register 23 which are to be printed by the printer 27. The third character determines whether the number is to be printed with American or European punctuation and can order the printing to take place only if the number in the I/O register is negative. The fourth character determines whether the printing of the I/O register 23 is to take place in red or black and whether it is also to be punched on paper tape. The fourth character may also order that the contents of the second and third character of the instruction be treated as a constant and transferred to the I/O register 23 for punching or printing either in black or in red.

A fifth value of the initial character of an instruction indicates that the instruction either controls the movement of the paper in the printer 27 or unlocks the alphanumeric keyboard. The second character selects the various rollers or sprockets of the printing unit 27 for controlling the movement of the various paper rolls or sheets. The third and fourth characters of this type of instruction control the paper movement with the controls selected by the second character and determine whether the printing of the information entered from the alphanumeric keyboard is to take place in black or red and whether the information printed is also to be punched on paper tape.

The printer 27 may be similar to that described in U.S. Pat. No. 3,404,765 which is assigned to the assignee of the present invention.

A sixth value of the initial character of an instruction indicates that the instruction orders a program jump. The second character of the instruction indicates the type of jump and the third and fourth character contain the 8 bit address on the program tape of the end of the jump.

Typical types of jumps are:

1. Unconditional.

2. Jump if I/O register 23 is not zero.

3. Jump if a selected jump condition indicating bit in the service area of the memory 19 is set.

4. Jump if overflow bit is set.

5. Unconditional jump to the track of the program tape indicated by the third character.

6. Jump if the sign of the I/O register 23 is negative.

7. Jump if selected keys on the command keyboard have been depressed.

If the third character of the instruction is zero, the control unit 17 causes the contents of the indirect address register to be transferred to the third character of the instruction register 13 and used as a portion of the program tape address.

In the execution of a jump instruction, control unit 17 first determines whether the jump condition has occured. If it has, the control unit 17 transfers the jump address from the instructin register 13 to the portion 35 of the service area of the memory 19 where the address of the next instruction to be executed is stored.

A seventh value of the initial character of the instruction is used for multiplication instructions. The econd character of the instruction indicates whether the operation is to take place with a multiplication of the result by $10^n$ or $10^{-n}$, where $n$ can vary between 0 and 7. The third character is the address of the memory register which contains the multiplier and the fourth character is the address of the memory register which is to receive the product.

The multiplication takes place between the contents of the register indicated in the third character of the instruction and the contents of the I/O register 23. If the third character of the instruction is zero the contents of the register indicated by the fourth character of the instruction is shifted by the amount indicated by the second character of the instruction. If both the thrid and the fourth characters are zero, the contents of the I/O register 23 are shifted by the amount indicated by the second character of the instruction.

The first character of a multiplication instruction also indicates whether the multiplication is to take place with rounding and what type of rounding is to be used.

Figure 4:
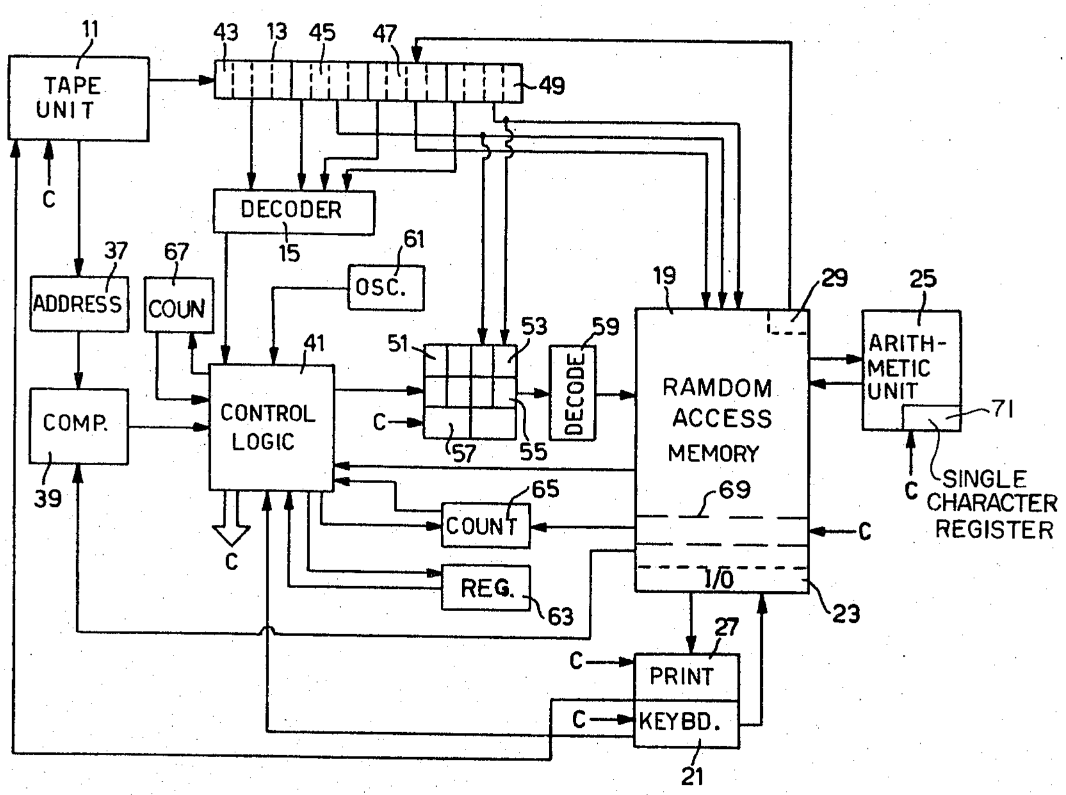
FIG. 4 is a more detailed block diagram of a computer according to the invention.

The operation of the computer in carrying out the instructions of the program will now be described in relation to the more detailed block diagram shown in FIG. 4 of the drawings. The addresses 31 (FIG. 2) of the instructions on the program type are read by the tape unit 11 as the portion of the tape on which they are recorded passes under the reading head and are transferred in turn to the 8-bit address register 37. The address in the register 37 is compared, bit-by-bit, in the comparator 39 with the address of the next instruction to be executed which is stored in the address storing portion 35 of the service area of the memory 19. If the comparison yields equality, the comparator 39 signals the control logic 41 to this effect and the control logic 41 signals the tape unit 11 over channel C to load the associated instruction into the instruction register 13. The address storing portion 35 of the service area is incremented at the end of the execution of each instruction except an executed jump instruction so that it will contain the address of the next instruction to be executed.

The instruction register 13 contains four 4 bit sections 43, 45, 47 and 49 which store the first, second, third and fourth characters, respectively, of the instruction to be executed.

The first character of the instruction, in portion 43 of the register 13, is decoded by decoder 15 and causes the control logic 41 to generate commands over channel C for controlling the operation of the computer to execute the instruction.

In the illustrated embodiment of the invention the memory 19 operates in a completely serial fashion. To select the rows of a memory register, the address of the selected register is inserted into the 4 bit counter 51 of counter system 53. The column addressed is selected by the 4 bit counter 55 included in the counter system 53 and one of the 4 bits within the column of the register is addressed by the 2 bit counter 57.

The counters of the counter system 53 address the memory 19 through the decoder 59. In addressing the bits of a memory register during arithmetic, shift and transfer operations, the counters 55 and 57 are originally set at zero by the control logic 41 for addressing the least significant bit of the least significant digit. The 2 bit counter 57 counts on every one or two memory cycles for addressing the next higher order bits in turn. The overflow of the counter 57 is used to increment counter 55 in order to address the next higher order digit of the selected memory register.

In order to address the bits of the service area of the memory 19, the control logic 41 inserts the address of the selected bit of the service area directly into the counter system 53. If it is desired to address a plurality of bits, such as in the case of the instruction address storing portion 35, the address of the least significant bit of portion 35 is loaded by the control logic 41 into the counter system 55 and then the counter 57 counts on the memory cycles in the same manner as was described above. In this case however its overflow is used to increment the register counter 51 instead of the column counter 55.

Figure 5:
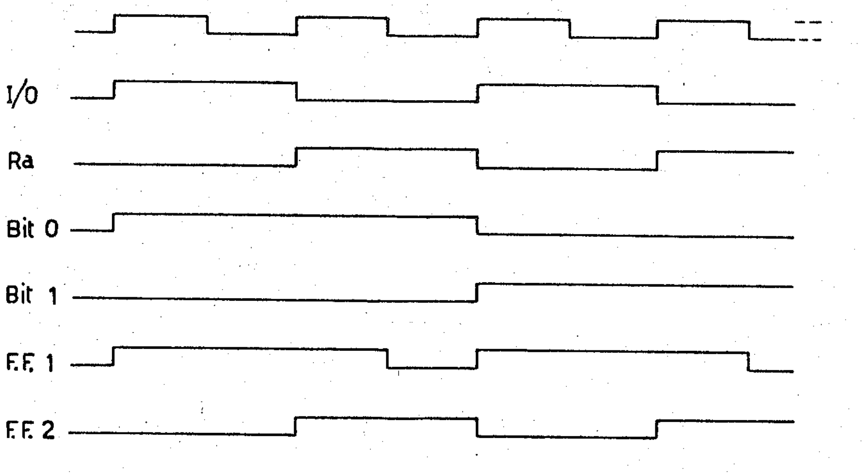
FIG. 5 is a timing diagram of memory addressing operations.

The memory cycles are syncronized and controlled by the memory clock signal shown in FIG. 5 of the drawings. This clock signal may be obtained by a frequency division of the system clock generated by oscillator 61. The memory clock signal is high during the first half of the memory cycle for allowing the reading of the addressed bit and low during the second half of the memory cycle for allowing the writing of a bit of information into the addressed location.

In executing an arithmetic type instruction which orders the transfer of the contents of the I/O register 23 to an addressed memory register, here called R*a*, the control logic 41 first clears the counter system 53. In this condition the counter system 53 addresses the least significant bit of the I/O register 23. The addressing of the I/O register is indicated by the trace labeled I/O in FIG. 5 going high. During the first half of the following memory cycle the addressed bit of the I/O register 23 is read from the memory and stored in Flip-Flop No. 1 (not shown) which may be located in the arithmetic unit 25, as is indicated by the trace labeled Flip-Flop No. 1 in FIG. 5. In the second half of the cycle the bit is rewritten into the same place in memory without erasing it from Flip-Flop No. 1.

At the beginning of the next memory cycle the control logic 11 transfers the register address Ra stored in the third or fourth character place of the instruction register 13 to the counter 51 without erasing the character place of the instruction register 13 as is indicated by the trace labeled R*a* going high. In this condition the least significant bit of the register R*a* is addressed by the counter system 53. During the second half of this next memory cycle the control logic 41 writes the bit stored in the Flip-Flop No. 1 into the addressed location thereby completing the transfer of the bit from the I/O register 23 to the register R*a*.

The beginning of the next memory cycle increments the bit counter 57, as is indicated by the trace labeled BIT O going low and the trace labeled BIT 1 going high, and clears the counter 51. Thus the second bit of the least significant character of the I/O register 23 is addressed by the counter system 53.

The computer continues in this manner transferring the subsequent bits from the I/O register 23 to the Flip-Flop No. 1 and from there to the register R*a* until all the bits are transferred. Every fourth bit the counter 57 overflows the increments counter 55 for addressing the next character.

The transfer of information from a register R*a* to the I/O register 23 takes place in much the same manner with the exception that the control logic 41 initially clears only counters 55 and 57 and transfers the address of the register Ra to the counter 51.

In operations, such as the transfer of a constant contained in the third and fourth characters of an instruction in the instruction register 13 to the I/O register 23, when it is necessary to address only one memory register, the bit counter 57 is incremented by the control logic 41 every memory cycle instead of every second memory cycle.

ADDITION AND SUBTRACTION

Addition and subtraction are performed algebraically in the arithmetic unit 25 on the contents of the I/O register 23 and the memory register R*a* addressed by the third or fourth character of the instruction in the instruction register 13.

In executing such an instruction, the computer first performs the preliminary operations of determining whether an addition or subtraction operation is to be performed by reading the sign bit, stored in the least significant bits of memory column number 14, of the I/O register 23 and the register Ra. The control logic 41 also senses the instruction character in the second character place 45 and whether address of the register is contained in the third or fourth character place of the register 13.

If a subtraction operation is to be performed, the control logic 41 performs a dry run of the operation, restoring the contents of the registers, in order to determine which number is larger. This is done because it is necessary to use a different algorithem depending on whether the subtrahend is larger or smaller than the minuend. In order to simplify the hardware the machine of the illustrated embodiment of the invention always subtracts the smaller number from the larger.

In an addition operation, the addressing of the memory takes place in a manner similar to that described for the transfer of a number from the I/O register 23 to an addressed register Ra. Again the control logic 41 initially clears the counter system 53 for addressing the least significant bit of the I/O register 23, transfers this bit to Flip-flop No. 1 and rerecords the bit in the I/O register 23. On the second memory cycle the control logic 41 again transfers the register address from the instruction register 13 to the counter 51. During the first half of this second memory cycle, however, the control logic 41 transfers the addressed bit of the Ra register to the Flip-Flop No. 2, which also may be included in the arithmetic unit 25, as is illustrated by the trace labeled Flip-Flop No. 2 in FIG. 5. The contents of these flip-flops are added by the arithmetic unit 25 and the sum bit is written in the addressed bit of the Ra resigter during the second half of the second memory cycle. The carry bit is retained by the arithmetic unit 25 for the next cycle. The control logic 41 steps through oil the bits of the addressed registers incrementing the bit counter 57 every two memories cycles in he same manner as was described above to complete the operation. Finally the control logic inserts the sign of the result into the least significant bit place of column 14 of the register R*a*.

The subtraction operation is performed in the same manner as was described for the addition operation with the exception that the control logic first performs a dry run of the operation to determine which number is larger. The control logic 41 then sends commands to the arithmetic unit 25 over channel C which set it up so that it subtracts the contents of the register storing the larger number from the contents of the register storing the smaller number.

After performing the addition or subtraction operation it is necessary to perform well known corrections on some of the digits of the result in order to express the result properly in binary-decimal code. To accomplish this the bits of the result, stored in register R*a* are transferred to the arithmetic unit 25 one at a time, operated upon, and restored in the register R*a*. In this portion of the operation, since only one memory register is involved, the bit counter 57 may be incremented on every memory cycle instead of every second memory cycle.

The arithmetic unit 25 may be similar to that described in U.S. Pat. No. 3,304,418 which is assigned to the assignee of the present invention.

JUMPING

When a jump instruction is inserted into the instruction register 13 the control logic 41 tests the jump condition specified in the second character of instruction and performs the jump if this condition is set or if the jump specified by the second character is unconditional. The different jump conditions specified in the second character may test whether a selected bit in the service area memory 19 is set, whether the sign of the I/O register 23 is negative or whether the contents of the I/O register 23 are not equal to zero. In the first two cases the control logic 41 inserts the addressed bit into the counter system 53 and senses the bit. In the third case, the control logic clears the counter system 53 and then steps it through the I/O register 23 testing each bit in turn.

The bits in the service area tested by the various jump conditions may be set from the keyboard 21, by a program instruction, or by the occurrence of an overflow condition in a multiplication operation.

The program address to which the jump is to be made is specified in the third and fourth characters of the jump instruction. If the jump is unconditional or if the condition has occurred, the control logic 41 inserts the address of the least significant bit of the address storing portion 35 of the service area into the counter system 53 and transfers the 8 bit jump address to the portion 35 from the instruction register 13. In this case the overflow of the bit counter 57 is used to increment the register counter 51 rather than the column counter 55.

After completing the transfer, the control logic 41, without first incrementing the address in the portion 35, orders the tape unit 11 to send the next instruction to the instruction register 13 in the normal way. If the jump condition has not occurred, the transfer is not executed. The control logic 41 just increments the address in the address portion 35 in the normal manner and orders the tape unit 11 to send the next instruction to the instruction register 13.

If the jump is to be executed and the third character of the jump instruction is zero, the control unit 41 inserts the address of the indirect address register 29 into the counter system 53 and transfers the contents of the indirect address register 29 to the third character place 47 of the instruction register 13. This is then used as a portion of the program address in the jump instruction.

MULTIPLICATION

Multiplication is performed between the contents of the I/O register 23 and the register Ra addressed by the third character of the multiplication instruction. The product is formed in the register R*b* addressed by the fourth character of the instruction. In carrying out the operation, the computer first adds the multiplicand in the I/O register 23 to the contents of the register R*b* the number of times specified by the least significant digit of the multiplier in the register Ra. Next the partial product in the register R*b* is shifted and rounded to one digit toward the least significant digit. Then the computer adds the contents of the I/O register 23 to the contents of the register Rb the number of times sepcified by the second digit of the multiplier in Ra.

This process of shifting and adding is repeated until 14 shifts have taken place and the least significant digit of the product is again in the least significant digit place of the register R*b*.

To perform these operations the control logic 41 first clears the register R*b* and the 4 bit counter 63 and then transfers the least significant character of the register R*a* to the 4-bit counter 65. If the contents of the counter 65 are not zero the control logic 41 then decrements the counter 65 and adds the contents of the I/O register 23 to the register R*b*, whose contents are in this case equal to zero, with the result going into the register R*b* in the same manner as was described for addition. The control logic 41 repeats these operations of decrementing and adding until the contents of the counter 65 are zero. When the counter 65 is zero the control logic 41 increments the counter 63 and shifts the contents of the register R*b* end-around one digit toward the least significant character. After doing this the control logic 41 transfers the contents of the counter 63 to the counter 55 and the contents of the third character portion 47 of the instruction register 13 to the counter 51. Next the control logic 41 shifts the addressed character from the register R*a* to the register 65. The control logic 41 then repeats the operations of decrementing the counter 65 and adding the I/O register 23 to the register R$b$ until the contents of the counter 65 are again zero when it once again increments the counter 63 and starts another cycle of the multiplication.

The control logic 41 counts the shifts of the register R$b$ in the counter 67. When the counter 67 indicates that 14 shifts have taken place, the least significant digit of the product is again in the least significant digit place of the register R$b$ and the multiplication is finished.

The second character of the multiplication instruction is used to indicate whether the multiplication is to take place with a multiplication of the product by $10^n$ or $10^{-n}$ where $n$ can be between 0 and 7. This is accomplished by carrying out only 14—$n$ shifts in the case of multiplication of the product by $10^n$ and by carrying out $14 + n$ shifts with the first $n$ shifts being end-off in the case of multiplication by $10^{-n}$.

If only 14—$n$ shifts are to be carried out the control logic 41 inserts an initial value of n into the counter 67. If $14 + n$ shifts are to be carried out, the control logic 41 inserts an initial value of n into the counter 67 and sets a flip-flop (not shown). While this flip-flop is set the counter 67 counts down towards zero on each shift. When the counter reaches zero it resets the flip-flop which causes it to begin to count up towards 14 on each shift. The first n shifts, which take place while the flip-flop is set, are end-off.

The first character of the multiplication instruction may order the multiplication to take place with a rounding of the result by the insertion of 5000000 or 9999999 into the register R$b$ before the first addition of the contents of the register r$b$ and the I/O register 23 is performed. The rounding instruction in the first character of the multiplication instruction is always accompanied in practice by an instruction for multiplying the product in the register R$b$ by $10^{-7}$.

In performing a multiplication operation there are several circumstances which may result in an overflow of the product. Examples of this may be if the multiplication is to take place with a multiplication of the product by $10^n$ and the number of digits in the multiplier in R$a$ plus $n$ is larger than 14, or if the most significant digits of the partial product in the register R$b$ flow over to the locations occupied by the least significant digits of the partial product during the shifting and adding phase of the multiplication. If an overflow condition occurs a flip-flop (not shown) in the arithmetic unit 25 is set. After the multiplication operation is completed, the contents of this flip-flop are transferred by the control logic 41 to a preselected location in the service area of the memory 19.

SHIFTING

The shifting of the contents of a memory register takes place in the execution of an instruction having a multiplication operation code in its initial character. If both the third and fourth characters of the instruction are occupied by a memory register address, the shifting takes place in the course of the execution of the multiplication instruction as described above. If the third character of the multiplication instruction is equal to zero, no multiplication takes place but the contents of the memory register specified in the fourth character of the instruction are shifted by the amount indicated by the second character of the instruction. If both the third and fourth characters of the instruction are equal to zero, the contents of the I/O register 23 are shifted by the amount indicated by the second character of the instruction.

The first 3 bits of the second character of the instruction indicate the amount of the shift and may take on any value between 0 and 7. The last bit of the second character indicates whether the shift is to have the significance of a multiplication of the contents of the memory register by $10^n$ or $10^{-n}$ where n is the number contained in the first three bits. In a multiplication by $10^{-n}$ the contents of the register are shifted end-off $n$ digit places toward the least significant digit place. In a multiplication by $10^n$, the contents of the register are shifted end-around 14—$n$ places toward the least significant digit place.

Figure 6:
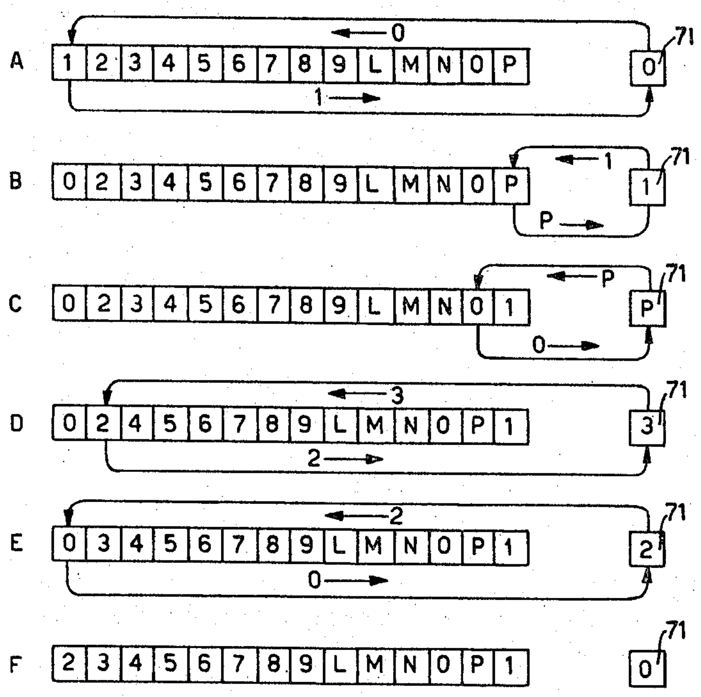
FIG. 6 illustrates how the shifting of the contents of a memory register is accomplished.

FIG. 6 of the drawings illustrates how the contents of a selected memory register 69 are shifted end-around one place toward the least significant digit place. The control logic 41 may be implemented in accordance with the teachings found in the "Design of the Control Unit of an Electronic Digital Computer" by Wilkes, Renwick and Wheeler, Proceedings of the IEE, June, 1957, pages 121–128. The control logic 41 first (FIG. 6A) transfers the least significant character of the memory register 69 to a one character register 71 which may be located in the arithmetic unit 25. As the control logic 41 transfers the bits of the least significant character from the memory register 69 to the register 71 on the first half of each memory cycle, it also transfers the corresponding bits of the register 71 to the bit places of the least significant character of the memory register 69 on the second half of each memory cycle. In this way the addressed character place of the memory register 69 and the register 71 exchange their contents.

Next (FIG. 6B) the control logic 41 exchanges the contents of the most significant character place of the memory register 69 with the contents of the register 71, thereby transferring the least significant digit of the contents of the register 69 to the most significant digit place of the register 69. In the third step (FIG. 6 C) the control logic 41 exchanges the contents of the next most significant digit place of the memory register 69 with the contents of the register 71 thereby completing the shift of the most significant digit of the contents of the memory register by one place towards the least significant digit place.

The control logic 41 continues to exchange the contents of the successively less significant digits of the contents of the memory register 69 with the contents of the register 71 until (FIG. 6E) it completes the shift by exchanging the contents of the least significant digit place of the register 69 with the contents of the register 71. This last exchange also restores the original contents of the register 71.

In order to shift the contents of the register 69 by a plurality of digit places, it is necessary to perform a series of one place shifts until the contents have been shifted by the desired amount.

If it is desired to shift the number in the register 69 endoff, the initial transfer of the contents of the least significant digit of the number in the register 69 to the register 71 is inhibited. In this way only the initial contents of the register 71 are transferred to the least significant bit place of the register 69 and the least significant digit of the contents of the register 69 is lost.

TAPE UNIT

The instructions of the program are stored on a loop of magnetic tape which is controlled by the tape unit 11.

In the illustrated embodiment of the invention, the instructions may be recorded on the loop in five tracks with each track containing up to 256 instructions. A single loop may be used to store several programs and the loops may be disposed in cartridges for making them easily interchangeable.

As stated above, the instructions may be interspersed on the tape in the manner illustrated in FIG. 2. After transferring an instruction to the instruction register 13 for execution the tape unit 11 does not stop the tape but keeps it moving. After the passage of a preselected time, before the next instruction to be executed is available on the tape, the tape unit 11 senses whether the execution of the previous instruction has been completed. If it is not completed, the tape unit 11 stops the tape until the control logic 41 signals that the execution is finished. If the instruction has been executed, the tape unit 11 keeps the tape moving and the control logic 41 compares, in comparitor, the addresses of the successive instructions with he addresses of the next instruction to be executed stored in portion 35 of the memory 19. When the comparison yields equality, the instruction accompanying the address is transferred to the instruction register 13 for execution.

In this manner the delay in the access time for the subsequent instructions on the tape is minimized. With the exception of instructions which control the mechanical part of the machine and some multiplication instructions, the computer has finished the execution of the instruction in the instruction register 13 before the tape unit 11 makes its check. Thus the tape unit 11 is able to keep the tape moving for reading the next instruction to be executed. The time between the sensing of whether the execution of the present instruction is completed and the occurance of the next instruction to be executed on the tape must be enough to allow enough tape to pass under the read-write heads (not shown) to allow the stopping and restarting of the tape if the execution of the present instruction is not completed.

The contents of the tape may be printed out on the printer 27 and a program may be recorded on the tape in response to commands by the operator from the keyboard 21.

In the case of recording information on the tape the successive instructions are entered from the keyboard 21 by the operator.

PERIPHERAL UNITS

The instruction repitoire of the computer according to the invention includes instructions for controlling the printer 27 and the keyboard 21 and may include instructions for controlling peripheral units which may be coupled to the basic computer.

These peripheral units may include, for instance, a paper tape reader and punch, a transmission terminal and other units necessary in a particular application.

In some cases the computer according to the invention is able to overlap the execution of two or more instructions.

For instance, when a first instruction for controlling the tabulation is being executed, after the control logic 41 sends the commands to the mechanical tabulation mechanism, the computer is able to execute a following instruction which does not involve the tabulation mechanism and does not have to wait until the relatively slow mechanical mechanism completes its operation.

What we claim is:

1. An electronic computer comprising:

a memory including a plurality of registers, each for storing a plurality of characters in corresponding stages, means for storing a single character, means for selecting a particular register of said plurality, means for exchanging a selected character stored in an associated stage of a selected memory register with said single character, control logic connected to said memory for controlling said exchanging means to exchange said single character with the character at a first end of a selected register and to sequentially exchange after having performed said first exchange, successive characters of the selected register with the character simultaneously stored in the single character storing means, starting from the character at the other end of said selected register, and a counter for counting the number of exchanges performed, after the first exchange, and for indicating when said exchanging means has sequentially exchanged all the characters of said selected register with said single character storing means, said control logic being responsive to the indication from said counter for halting the operation of said exchanging means.

2. The computer of claim 1 wherein said control logic includes means for selectively inhibiting the transfer of the character at said first end of said selected register to said single character storing means during the first exchange of the character at said first end of said selected register and said single character storing means.

3. An electronic computer having a memory formed at least with one memory register for storing a plurality of characters, a single character register, means for exchanging one character in said memory register with the character of said single character register, a logic unit controlling said exchanging means for exchanging at first the character of said single character register with the character at one end of said memory register and, after having performed said first exchange, for exchanging sequentially the successive characters of said memory register with the character each time stored in said character register starting from the character at the other end from said one end of said memory register, and counting means for counting the number of exchanges performed after said first exchange to indicate to said logic unit when all characters of said memory register have been exchanged for halting the operation of said exchanging means.

* * * * *